United States Patent
Sortore et al.

(10) Patent No.: US 8,698,367 B2
(45) Date of Patent: Apr. 15, 2014

(54) HIGH-SPEED PERMANENT MAGNET MOTOR AND GENERATOR WITH LOW-LOSS METAL ROTOR

(75) Inventors: Christopher Sortore, Roanoke, VA (US); Victor Iannello, Roanoke, VA (US); Robert Jett Field, Fincastle, VA (US)

(73) Assignee: Synchrony, Inc., Olean, NY (US)

(*) Notice: Subject to any disclaimer, the term of this patent is extended or adjusted under 35 U.S.C. 154(b) by 434 days.

(21) Appl. No.: 12/424,600

(22) Filed: Apr. 16, 2009

(65) Prior Publication Data

US 2009/0261678 A1  Oct. 22, 2009

Related U.S. Application Data

(60) Provisional application No. 61/045,660, filed on Apr. 17, 2008.

(51) Int. Cl.
*H02K 1/28* (2006.01)

(52) U.S. Cl.
USPC ............ 310/156.31; 310/156.08; 310/156.28; 310/262; 310/216.114

(58) Field of Classification Search
USPC ............ 310/156.12, 156.28, 156.31, 156.53, 310/216.058, 216.099, 156.63, 156.51, 310/156.52, 156.75, 262, 158.08, 156.29, 310/90.5, 156.27; 1/156.12, 156.28, 1/156.31, 156.53, 216.058, 216.099, 1/156.63, 156.51, 156.52, 156.75, 262
See application file for complete search history.

(56) References Cited

U.S. PATENT DOCUMENTS

| | | | | |
|---|---|---|---|---|
| 2,221,983 A | * | 11/1940 | Mayer et al. | 428/213 |
| 2,408,641 A | * | 10/1946 | Hitchcock | 310/216.099 |
| 2,877,366 A | * | 3/1959 | Carr | 310/156.51 |
| 3,146,300 A | | 8/1964 | Beckius | |
| 3,221,194 A | * | 11/1965 | Blackburn | 310/156.51 |
| 3,715,659 A | | 2/1973 | Abnett | |
| 3,777,194 A | | 12/1973 | Schaefer | |
| 4,080,012 A | | 3/1978 | Boden | |
| 4,112,751 A | | 9/1978 | Grunbaum | |
| 4,117,360 A | * | 9/1978 | Richter | 310/183 |
| 4,144,469 A | * | 3/1979 | Miyashita et al. | 310/156.28 |
| 4,177,360 A | | 12/1979 | Fujimoto | |
| 4,199,952 A | | 4/1980 | Berg | |
| 4,245,869 A | | 1/1981 | Scheffer | |
| 4,270,936 A | | 6/1981 | Mann | |

(Continued)

FOREIGN PATENT DOCUMENTS

| CN | 2706952 | 6/2005 |
|---|---|---|
| CN | 101438358 | 5/2009 |

(Continued)

OTHER PUBLICATIONS

Machine Translation, Sakai, JP 9-149572, Jun. 1997.*

(Continued)

*Primary Examiner* — Burton Mullins
(74) *Attorney, Agent, or Firm* — Edmonds & Nolte, PC

(57) ABSTRACT

An electric machine is provided including a rotor having a plurality of magnets retained on the rotor. The plurality of magnets are retained via a sleeve. The sleeve is retained via a band. The band includes a stacked plurality of washer laminations. Each of the plurality of washer laminations is electrically insulated from an adjacent washer lamination.

15 Claims, 5 Drawing Sheets

(56) References Cited

U.S. PATENT DOCUMENTS

| | | | |
|---|---|---|---|
| 4,286,010 A | 8/1981 | Staley | |
| 4,353,602 A | 10/1982 | Habermann | |
| 4,389,849 A | 6/1983 | Gasser et al. | |
| 4,618,792 A | 10/1986 | Yates | |
| 4,650,132 A | 3/1987 | Graf | |
| 4,703,662 A | 11/1987 | Gabelli | |
| 4,742,258 A * | 5/1988 | Earle et al. | 310/156.53 |
| 4,873,598 A | 10/1989 | Negishi et al. | |
| 4,893,040 A * | 1/1990 | Turner et al. | 310/156.25 |
| 4,896,088 A | 1/1990 | Jahns | |
| 4,920,291 A | 4/1990 | McSparran | |
| 4,962,085 A | 10/1990 | deBarbadillo | |
| 4,962,089 A | 10/1990 | Boden | |
| 4,982,126 A | 1/1991 | Jolivet | |
| 5,013,987 A | 5/1991 | Wakui | |
| 5,021,698 A | 6/1991 | Pullen | |
| 5,136,854 A | 8/1992 | Abdelmalek | |
| 5,153,475 A | 10/1992 | McSparran | |
| 5,250,865 A | 10/1993 | Meeks | |
| 5,256,638 A | 10/1993 | Weinberger | |
| 5,291,735 A | 3/1994 | Kesten | |
| 5,300,841 A | 4/1994 | Preston | |
| 5,300,842 A | 4/1994 | Lyons | |
| 5,300,843 A | 4/1994 | Lyons | |
| 5,327,069 A | 7/1994 | Radun | |
| 5,347,190 A | 9/1994 | Lewis | |
| 5,355,041 A | 10/1994 | Shirao | |
| 5,355,042 A | 10/1994 | Lewis | |
| 5,434,427 A | 7/1995 | Crane | |
| 5,469,007 A | 11/1995 | Toyama | |
| 5,530,306 A | 6/1996 | Ueyama | |
| 5,539,323 A | 7/1996 | Davis | |
| 5,554,583 A * | 9/1996 | Hull et al. | 505/166 |
| 5,565,722 A | 10/1996 | Rubner | |
| 5,578,880 A | 11/1996 | Lyons | |
| 5,682,071 A | 10/1997 | Buhler | |
| 5,705,918 A | 1/1998 | Davis | |
| 5,729,066 A | 3/1998 | Soong | |
| 5,739,609 A | 4/1998 | Ueyama | |
| 5,743,654 A | 4/1998 | Ide | |
| 5,744,887 A * | 4/1998 | Itoh | 310/156.28 |
| 5,757,196 A | 5/1998 | Wetzel | |
| 5,760,510 A | 6/1998 | Nomura | |
| 5,761,921 A | 6/1998 | Hori | |
| 5,808,392 A | 9/1998 | Sakai | |
| 5,811,905 A | 9/1998 | Tang | |
| 5,857,348 A | 1/1999 | Conry | |
| 5,866,964 A | 2/1999 | Li | |
| 5,872,507 A | 2/1999 | Weber | |
| 5,878,584 A | 3/1999 | Sasaki | |
| 5,880,549 A | 3/1999 | Chiba | |
| 5,894,210 A | 4/1999 | Brown | |
| 5,923,142 A | 7/1999 | Li | |
| 5,936,370 A | 8/1999 | Fukao | |
| 5,939,807 A | 8/1999 | Patyk | |
| 5,955,811 A | 9/1999 | Chiba | |
| 5,962,942 A | 10/1999 | Pullen | |
| 5,973,468 A | 10/1999 | Yamauchi | |
| 6,014,002 A | 1/2000 | Guinet | |
| 6,040,650 A | 3/2000 | Rao | |
| 6,050,083 A | 4/2000 | Meckler | |
| 6,104,111 A | 8/2000 | Pullen | |
| 6,147,425 A | 11/2000 | Ueyama | |
| 6,148,634 A | 11/2000 | Sherwood | |
| 6,181,092 B1 | 1/2001 | Turner | |
| 6,184,640 B1 | 2/2001 | Kawashima | |
| 6,191,755 B1 | 2/2001 | Hamaaratsu | |
| 6,194,800 B1 | 2/2001 | Maruyama | |
| 6,195,869 B1 | 3/2001 | Pullen | |
| 6,198,183 B1 | 3/2001 | Baeumel | |
| 6,198,803 B1 | 3/2001 | Osama | |
| 6,208,051 B1 | 3/2001 | Ando | |
| 6,233,938 B1 | 5/2001 | Nicodemus | |
| 6,253,563 B1 | 7/2001 | Ewert | |
| 6,304,011 B1 | 10/2001 | Pullen | |
| 6,309,188 B1 | 10/2001 | Danner | |
| 6,326,712 B1 | 12/2001 | Nakazawa | |
| 6,346,757 B1 | 2/2002 | Shinozaki | |
| 6,362,549 B1 | 3/2002 | Shi | |
| 6,380,652 B1 | 4/2002 | Ueyama | |
| 6,388,981 B1 | 5/2002 | Sohn | |
| 6,404,097 B1 | 6/2002 | Pullen | |
| 6,424,069 B1 | 7/2002 | Pullen | |
| 6,441,580 B2 | 8/2002 | Marcinkiewicz | |
| 6,455,966 B1 | 9/2002 | Barada | |
| 6,469,487 B2 | 10/2002 | Ewert | |
| 6,472,787 B1 | 10/2002 | Kameno | |
| 6,483,212 B1 | 11/2002 | Mimura | |
| 6,486,683 B1 | 11/2002 | Nussbaum | |
| 6,489,701 B1 | 12/2002 | Gamble | |
| 6,515,387 B1 | 2/2003 | Shinozaki | |
| 6,519,273 B2 | 2/2003 | Sekiguchi | |
| 6,559,568 B2 | 5/2003 | Maejima | |
| 6,570,285 B2 | 5/2003 | Shinozaki | |
| 6,590,366 B1 | 7/2003 | Browning | |
| 6,617,733 B1 | 9/2003 | Yamauchi | |
| 6,617,734 B2 | 9/2003 | Taniguchi | |
| 6,657,345 B2 | 12/2003 | Shinozaki | |
| 6,657,348 B2 * | 12/2003 | Qin et al. | 310/156.28 |
| 6,666,134 B2 | 12/2003 | Gusching | |
| 6,735,945 B1 | 5/2004 | Hall | |
| 6,770,992 B2 | 8/2004 | Yamauchi | |
| 6,777,841 B2 | 8/2004 | Steinmeyer | |
| 6,798,097 B2 | 9/2004 | Pullen | |
| 6,809,449 B2 | 10/2004 | Shinozaki | |
| 6,809,450 B1 | 10/2004 | Morrison | |
| 6,822,355 B2 | 11/2004 | Karrelmeyer | |
| 6,831,384 B2 | 12/2004 | Ries | |
| 6,849,979 B2 | 2/2005 | Brunet | |
| 6,873,075 B2 | 3/2005 | Taira | |
| 6,892,522 B2 | 5/2005 | Brasz | |
| 6,912,773 B2 | 7/2005 | Pullen | |
| 6,927,550 B2 | 8/2005 | Tamisier | |
| 6,949,853 B2 | 9/2005 | Kawashima | |
| 6,984,907 B2 | 1/2006 | Barada | |
| 6,997,010 B2 | 2/2006 | Suzuki | |
| 7,002,273 B2 | 2/2006 | Schippl | |
| 7,005,864 B2 | 2/2006 | Iannello | |
| 7,013,644 B2 | 3/2006 | Radcliff | |
| 7,017,357 B2 | 3/2006 | Brasz | |
| 7,023,118 B1 | 4/2006 | Morrison | |
| 7,053,511 B2 | 5/2006 | Taniguchi | |
| 7,053,582 B2 | 5/2006 | Ueyama | |
| 7,065,979 B2 | 6/2006 | Arshansky | |
| 7,091,641 B2 | 8/2006 | Kawashima | |
| 7,138,738 B2 | 11/2006 | Shimada | |
| 7,156,627 B2 | 1/2007 | Lenderink | |
| 7,235,907 B2 | 6/2007 | Shimada | |
| 7,268,453 B2 | 9/2007 | Shimada | |
| 7,274,123 B2 | 9/2007 | Shimada | |
| 7,285,887 B2 | 10/2007 | Shimada | |
| 7,288,915 B2 | 10/2007 | Norman | |
| 7,343,663 B2 * | 3/2008 | Hodowanec et al. | 29/598 |
| 7,355,833 B2 | 4/2008 | Kozaki | |
| 7,394,229 B2 | 7/2008 | Lim | |
| 7,436,093 B2 | 10/2008 | Brunet | |
| 7,466,051 B2 * | 12/2008 | Miya et al. | 310/90.5 |
| 7,471,022 B2 | 12/2008 | Sortore | |
| 7,501,782 B2 | 3/2009 | Buhler | |
| 7,536,869 B2 | 5/2009 | Inaba | |
| 7,545,066 B2 | 6/2009 | Baudelocque | |
| 7,564,670 B2 | 7/2009 | Kozaki | |
| 7,583,000 B2 | 9/2009 | Durham | |
| 7,633,201 B2 | 12/2009 | Buhler | |
| 7,635,937 B2 | 12/2009 | Brunet | |
| 7,679,248 B2 | 3/2010 | Kozaki | |
| 7,687,948 B2 | 3/2010 | Sortore | |
| 7,737,590 B2 | 6/2010 | Oyama | |
| 7,919,898 B2 * | 4/2011 | Wang et al. | 310/216.058 |
| 7,932,655 B2 | 4/2011 | Buhler | |
| 7,944,104 B2 | 5/2011 | Barada | |
| 7,977,839 B2 | 7/2011 | Barada | |
| 7,986,070 B2 | 7/2011 | Baudelocque | |
| 8,018,106 B2 | 9/2011 | Buhler | |

(56) References Cited

U.S. PATENT DOCUMENTS

| | | |
|---|---|---|
| 2001/0024099 A1 | 9/2001 | Greif |
| 2002/0029897 A1 | 3/2002 | Younsi |
| 2002/0148225 A1 | 10/2002 | Lewis |
| 2002/0149331 A1 | 10/2002 | Marcinkiewicz |
| 2002/0176943 A1 | 11/2002 | Pereira |
| 2003/0038553 A1 | 2/2003 | Andres |
| 2003/0132673 A1 | 7/2003 | Zhou |
| 2004/0046467 A1 | 3/2004 | Huang |
| 2004/0088992 A1 | 5/2004 | Brasz |
| 2004/0189132 A1 | 9/2004 | Horst |
| 2005/0070275 A1 | 3/2005 | Jeyaseelan |
| 2005/0077793 A1 | 4/2005 | Garvey |
| 2005/0110363 A1 | 5/2005 | Hoffmann |
| 2005/0223737 A1 | 10/2005 | Conry |
| 2006/0026981 A1 | 2/2006 | Inaba |
| 2006/0243683 A1 | 11/2006 | Onachilla |
| 2006/0273683 A1 | 12/2006 | Caprio |
| 2007/0200438 A1 | 8/2007 | Kaminski |
| 2007/0200440 A1 | 8/2007 | Kalsi |
| 2007/0273322 A1 | 11/2007 | Ramu |
| 2008/0045413 A1 | 2/2008 | Ko |
| 2008/0073993 A1 | 3/2008 | Sortore |
| 2008/0238234 A1 | 10/2008 | Saban |
| 2009/0261678 A1 | 10/2009 | Sortore |
| 2009/0265038 A1 | 10/2009 | Ramsey |
| 2010/0009833 A1 | 1/2010 | Ryu |
| 2010/0171383 A1* | 7/2010 | Petrov et al. ............. 310/156.28 |
| 2011/0316376 A1 | 12/2011 | Sortore |

FOREIGN PATENT DOCUMENTS

| | | | |
|---|---|---|---|
| DE | 2355104 | 5/1975 | |
| EP | 0411697 | 7/1990 | |
| EP | 0693630 | 1/1996 | |
| EP | 0693630 | 2/1996 | |
| EP | 1063753 | 12/2000 | |
| FR | 2574880 | 6/1986 | |
| JP | S6126460 A | 2/1986 | |
| JP | 63-154048 * | 6/1988 | ............. H02K 21/06 |
| JP | H0913007 A | 5/1997 | |
| JP | 9-149572 * | 6/1997 | ............... H02K 1/27 |
| JP | 09-149572 | 6/1997 | |
| JP | 2001-169487 * | 6/2001 | ............... H02K 1/27 |
| JP | 2001169486 A | 6/2001 | |
| JP | 20020078258 A | 3/2002 | |
| JP | 2004173341 A | 6/2004 | |
| JP | 2010-210692 A | 9/2010 | |
| RU | 2241296 | 11/2004 | |
| SU | 1830591 | 7/1993 | |
| WO | WO0035230 | 6/2000 | |
| WO | WO02096146 | 11/2002 | |
| WO | WO2006061671 | 6/2006 | |
| WO | WO2008039124 | 4/2008 | |
| WO | WO2009140022 | 11/2009 | |
| WO | WO2009146189 | 12/2009 | |
| WO | WO2011005552 | 1/2011 | |
| WO | WO2011163456 | 12/2011 | |

OTHER PUBLICATIONS

English machine translation, Nakano, JP 2001-169487, Jun. 2001.*
Klyukhin, "Analysis of Eddy Current Distributions in the CMS Magnet Yoke During the Solenoid Discharge", Jun. 1, 2005, 4 pages, IEEE Transactions on Nuclear Science, vol. 52, No. 3.
EP 0 693 630—European Search Report dated Oct. 31, 1997.
PCT/SE2006/050348—International Search Report dated Feb. 24, 2007.
PCT/US2007/014090—International Search Report and Written Opinion mailed Aug. 25, 2008.
PCT/US2007/014090—International Preliminary Report on Patentability mailed Dec. 15, 2008.
PCT/US2009/040790—International Search Report and Written Opinion mailed Jun. 9, 2009.
PCT/US2009/040735—International Search Report and Written Opinion mailed Jun. 16, 2009.
PCT/US2009/059481—International Search Report and Written Opinion mailed Sep. 9, 2010.
PCT/US2009/040735—International Preliminary Report on Patentability mailed Oct. 19, 2010.
PCT/US2009/040790—International Preliminary Report on Patentability mailed Oct. 19, 2010.
PCT/US2010/039582—International Search Report and Written Opinion mailed May 31, 2011.
PCT/US2011/041593—International Search Report and Written Opinion mailed Oct. 31, 2011.
PCT/US2010/039582—International Preliminary Report on Patentability dated Jan. 4, 2012.
PCT/US2009/059481—International Preliminary Report on Patentability mailed Apr. 19, 2012.
Mushi, "Design, Construction and Modeling of a Flexible Rotor Active Magnetic Bearing Test Rig" 2009, 10 pages, Draft-Proceedings of ASME Turbo Expo 2010: Power for Land, Sea and Air, Jun. 14-18, 2010, Glasgow, UK.
Garcia, Ferreiro et al., "Diagnosis of Active Magnetic Bearings" [Diagnosis de Cojinetes Magneticos Activos], XXVII Automation Symposium, Year 2001, Sep. 5-7, 2001, University of Huelva, Spain (D3).
Boylestad, "Electronic Devices and Circuit Theory, 5th edition," Jan. 1, 1992, 8 pages, Prentice Hall Career & Technology, Englewood Cliffs, New Jersey.
Klyukhin, "Analysis of Eddy Current Distributions in the CMS Magnet Yoke During the Solenoid Discharge", Jun. 2005, 4 pages, IEEE Transactions on Nuclear Science, vol. 52, No. 3.

* cited by examiner

HIGH-SPEED PERMANENT MAGNET MOTOR AND GENERATOR WITH LOW-LOSS METAL ROTOR

CROSS-REFERENCES TO RELATED APPLICATIONS

This application claims priority to pending U.S. Provisional Patent Application Ser. No. 61/045,660, filed 17 Apr. 2008.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a system, machine, device, manufacture, circuit, and/or method adapted for providing an electric machine comprising: a rotor comprising a plurality of rare earth magnets retained on said rotor via a sleeve that is retained via a band comprising a stacked plurality of washer laminations, each of said washer laminations electrically insulated from an adjacent washer lamination.

Permanent magnet (PM) motors and/or generators can be used in many applications that can require high power density and/or high efficiency. Because the size of an electrical machine typically scales with its torque capability, at a given power level, the size of the machine can often be reduced by increasing its rotational speed. Thus, the desire to achieve high power density and/or high efficiency often requires that the shaft or rotor of the PM machine spins at speeds greater than 10,000 rpm, and for some applications, as high as 100,000 rpm.

Figure 1:
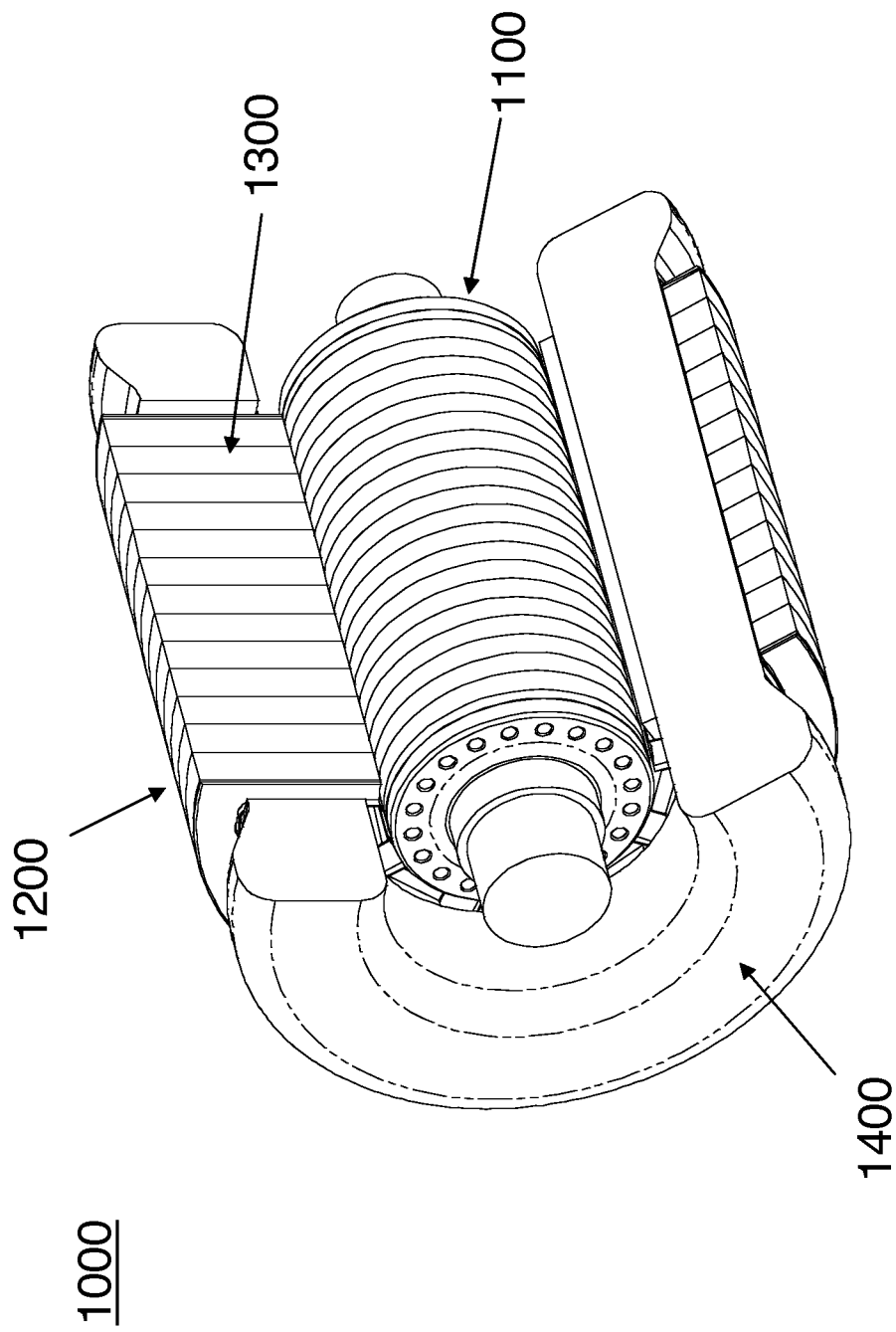
FIG. 1 is a perspective cut-away view of an exemplary embodiment of a system 1000.

In a brushless PM machine, magnets typically are located on the rotor, and when spun, produce a rotating field in the stator. In some PM machines, two or more magnets can be located on the outer diameter (OD) of the rotor, and/or can be radially polarized, so that magnetic flux crosses the air gap between the rotor and stator in a radial direction. These machines are sometimes referred to as radial flux machines. FIG. 1 shows an exemplary radial flux PM machine 1000 with a high speed rotor 1100, which is surrounded by a stator 1200, which can comprise stator laminations 1300 and/or coil windings 1400.

In certain exemplary embodiments, a PM machine can utilize a radial flux design in which four magnet arcs are mounted on the rotor to produce a four-pole magnetic field. The stator in turn can be wound as a 3-phase, 4-pole machine.

For low speed machines, the magnets can be attached to the OD of the rotor using adhesives. However, because the centrifugal forces go up as the square of the rotational speed, at higher speeds, these forces can require that the magnets be mechanically retained on the rotor.

Figure 2:
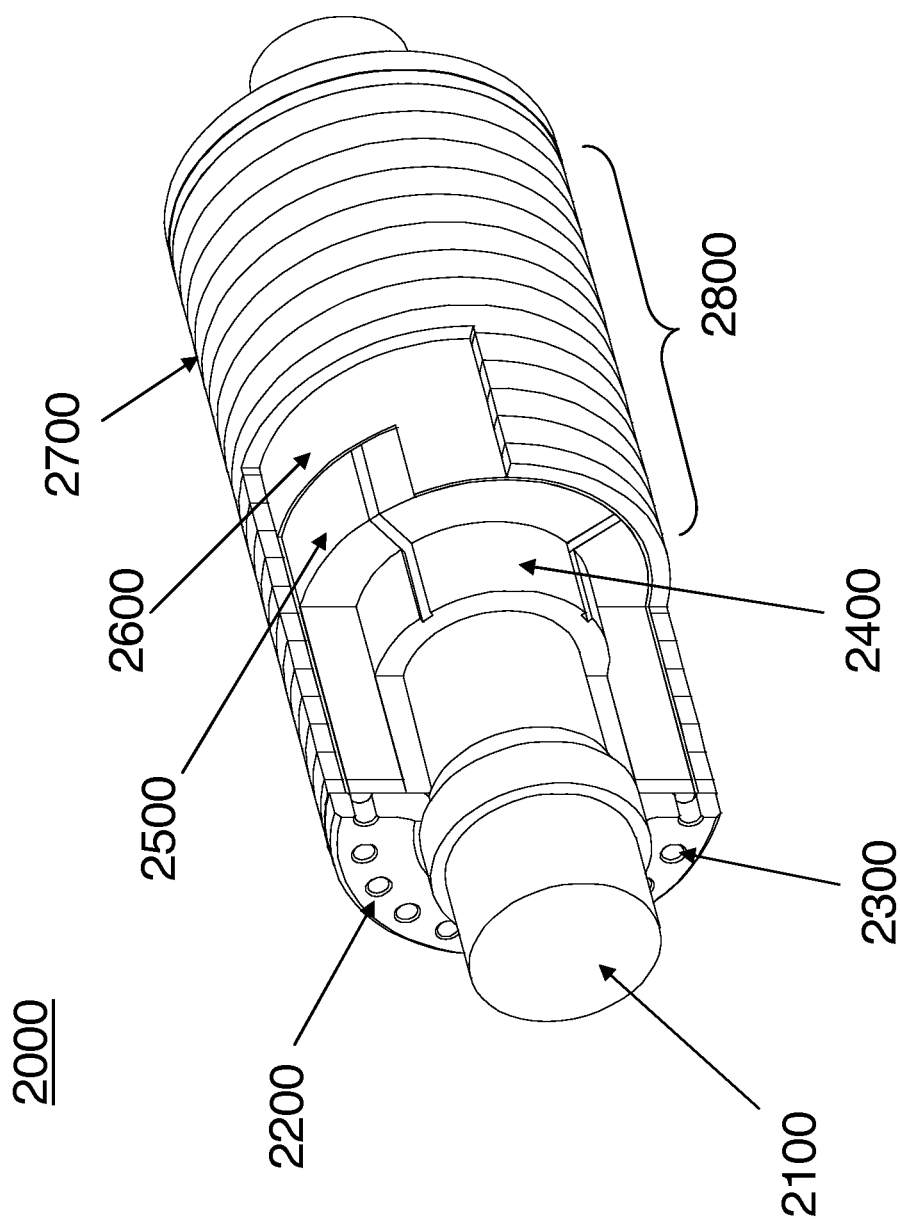
FIG. 2 is a perspective cut-away view of an exemplary embodiment of a system 2000.

As shown in FIG. 2, certain exemplary embodiments of a system 2000 can utilize a rotor 2100 that incorporates rare-earth permanent magnets 2500, such as Samarium Cobalt (Sm—Co) and/or Neodymium Iron Boron (Nd—Fe—B) (the magnetic field of the Nd—Fe—B material typically is higher, but the Sm—Co often has better high temperature characteristics.)

Magnets 2500 can be retained by a containment band 2800 that can comprise a stacked length of washer laminations 2700, where the lamination material can be a high strength steel, such as Inconel®, having a yield strength of approximately 150 ksi to approximately 200 ksi, which can depend upon the exact material chosen and/or exact conditions, such as heat treatment of the material. Magnetic (as opposed to non-magnetic) high-strength steel laminations can be used as the containment band 2800, but the electromagnetic performance of a rotor constructed with this material might be substantially degraded due to magnetic losses.

Each lamination 2700 can be electrically insulated from the adjoining laminations with a thin, insulating coating, as is commonly done with other lamination stacks. A first exemplary lamination can have dimensions of approximately: 2.06"OD, 1.87"ID, and/or 0.004" lamination thickness. A second exemplary lamination can have dimensions of approximately: 6.22"OD, 5.67"ID, and/or 0.004" lamination thickness.

Band 2800 can have a yield strength of over 170 ksi and/or a maximum temperature capability of over 1000 F. However, because band 2800 is laminated, the losses due to eddy currents are a fraction of those of a solid steel band.

A sleeve 2600 can be located between the magnets 2500 and the laminated band 2800, and can serve to significantly temporally attenuate the higher order components of the magnetic field, which can arise when the magnetic field of the rare earth magnets interact with slots of the stator. Sleeve 2600 can be constructed of aluminum and/or can have a yield strength of approximately 35 ksi to approximately 95 ksi, which can depend upon the exact material chosen and/or exact conditions, such as heat treatment of the material. A first exemplary sleeve can have dimensions of approximately: 1.87"OD, 1.83"ID, and/or 4.20" length. A second exemplary sleeve can have dimensions of approximately: 5.67"OD, 5.58"ID, and/or 6.70" length.

Threaded holes 2300 for mechanical balancing can be located in end caps 2200 on either end of the rotor. End caps 2200 can be constructed from a non-magnetic, high-strength steel, such as Inconel 718 and/or Nitronic 60. A first exemplary end cap can have dimensions of approximately: 1.96"OD, 1.05"ID, and/or 0.20" thickness. A second exemplary end cap can have dimensions of approximately: 5.93"OD, 3.50"ID, and/or 0040" thickness. Screws (not shown) can be inserted into one or more holes 2300 in both caps 2200 so that rotor 2100 can be dynamically balanced along two planes.

A substantially cylindrical thin-walled sleeve-like hub 2400 can be positioned between the outer circumference of rotor 2100 and the inner circumference of magnets 2500. Hub 2400 can be constructed of magnetic steel.

Rotor 2100 may rotate at speeds ranging from 0 rpm to 10,000 rpm, and even 100,000 rpm (including all values and sub-ranges therebetween). A first exemplary rotor having an OD of 2.06" may operate at 60,000 rpm. A second exemplary rotor having an OD of 6.22" may operate at 20,000 rpm. A typical operating rotor surface speed can be 165 m/s.

Rotor 2100 might experience operating temperatures of approximately 200 F-approximately 400 F. Although possible, typically one would not want to operate rotor 2100 continuously at higher elevated temperature, because magnets 2500 might demagnetize, although the containment band 2800 is unlikely to fail even at substantially elevated temperature.

During operation, certain exemplary embodiments can reduce eddy current losses by more than approximately 75% as compared with a solid (non-laminated) rotor metallic containment band.

Figure 3:
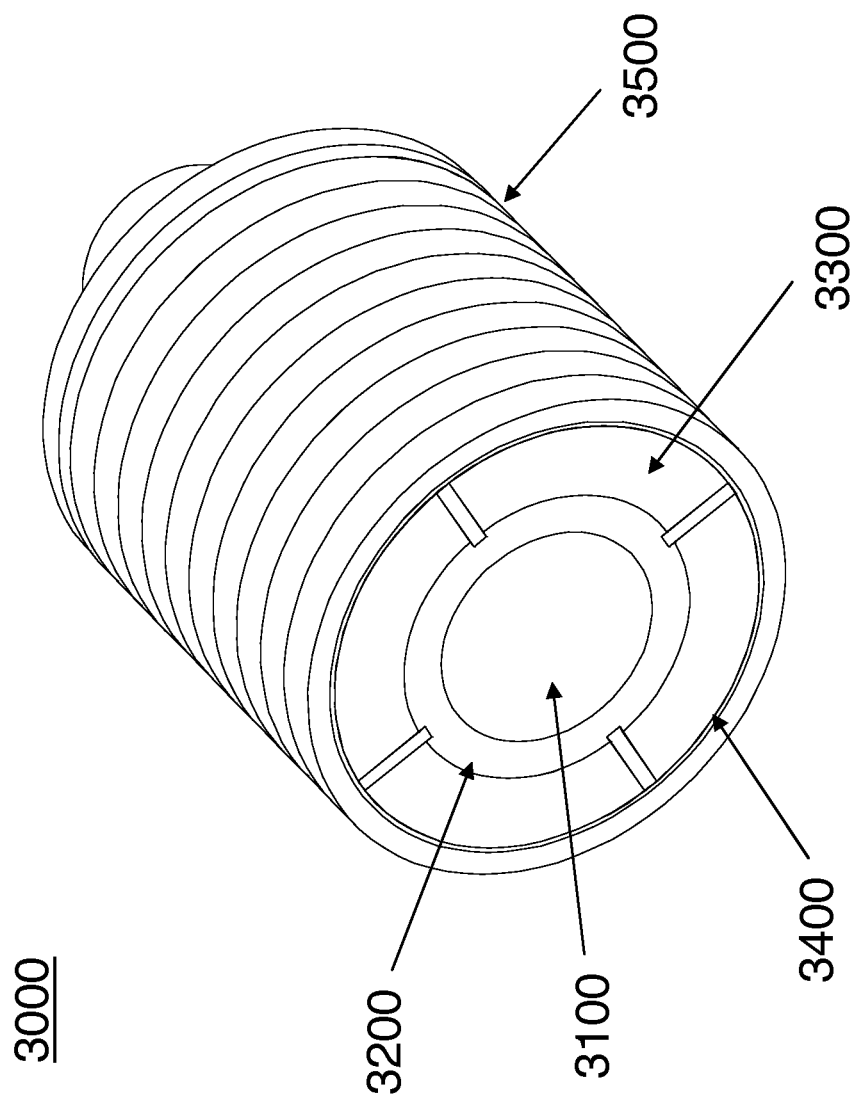
FIG. 3 is a perspective view of an exemplary embodiment of a system 3000.

FIG. 3 shows a solid perspective view of a system 3000 comprising a rotor 3100, which is substantially circumferentially surrounded by hub 3200, which is substantially circumferentially surrounded by magnets 3300, which are substantially circumferentially surrounded by sleeve 3400, which is substantially circumferentially surrounded by containment band 3500.

Figure 4:
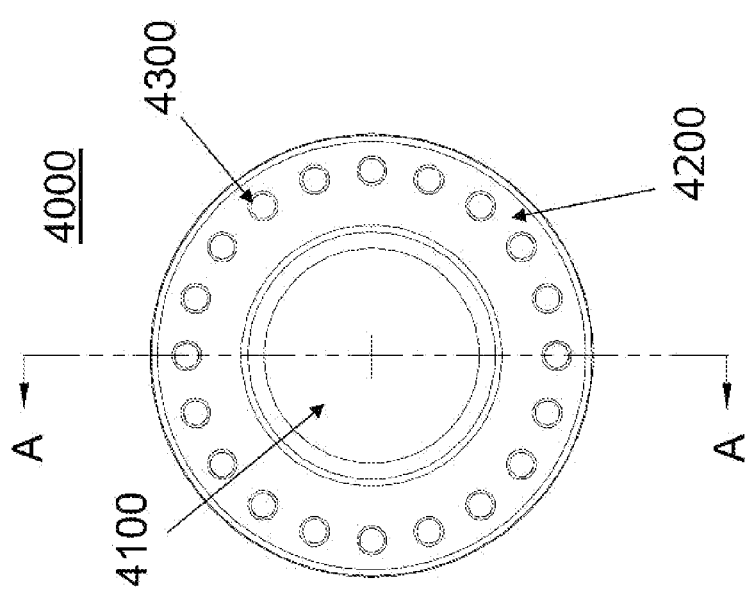
FIG. 4 is an end view of an exemplary embodiment of a system 4000.

FIG. 4 shows an end view of a system 4000, comprising a rotor 4100, a small portion of which can be substantially circumferentially surrounded by an end cap 4200, which can comprise a radially-distributed array of balancing holes 4300.

Figure 5:
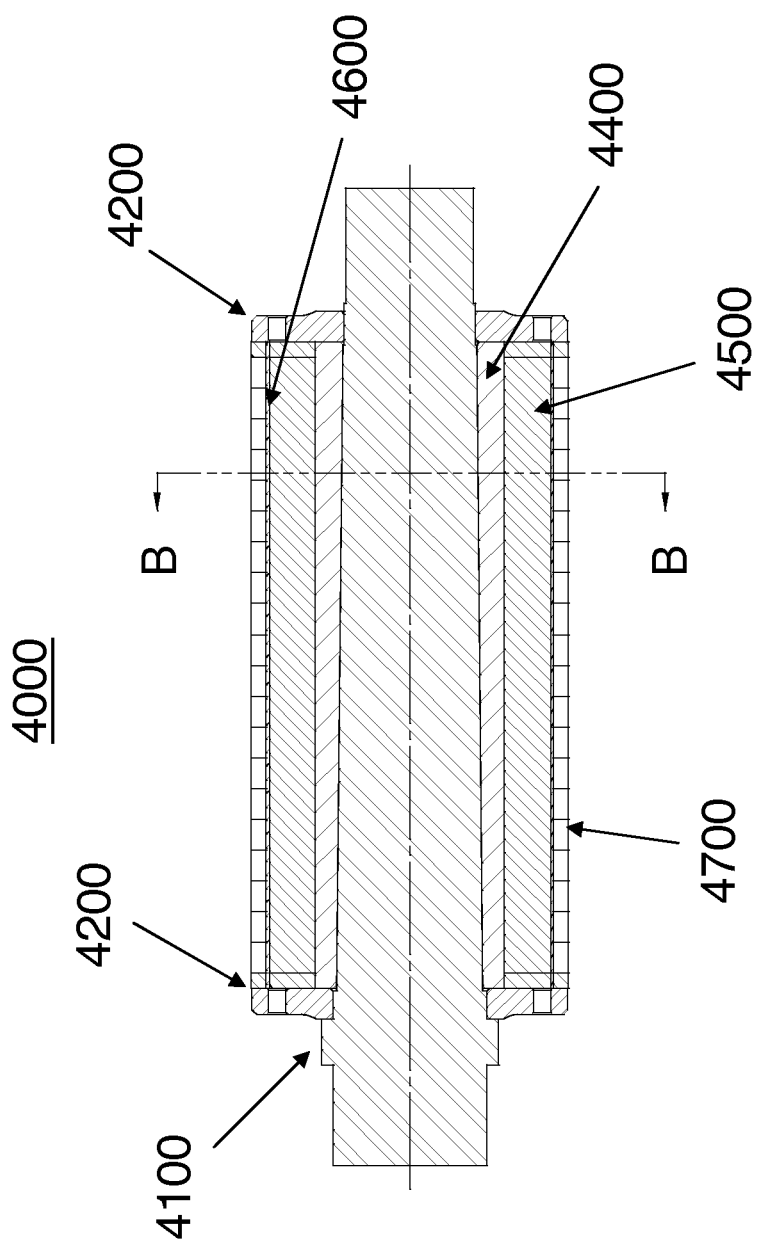
FIG. 5 is a cross-sectional view of an exemplary embodiment of a system 4000 taken at section A-A of FIG. 4.

FIG. 5 shows a cross-section of system 4000 taken along section A-A of FIG. 4. System 4000 can comprise rotor 4100, small portions of which can be substantially circumferentially surrounded by end caps 4200. A larger portion of rotor 4100 can be substantially circumferentially surrounded by hub 4400, which can be substantially circumferentially surrounded by magnets 4500, which can be substantially circumferentially surrounded by sleeve 4600, which can be substantially circumferentially surrounded by band 4700.

Figure 6:
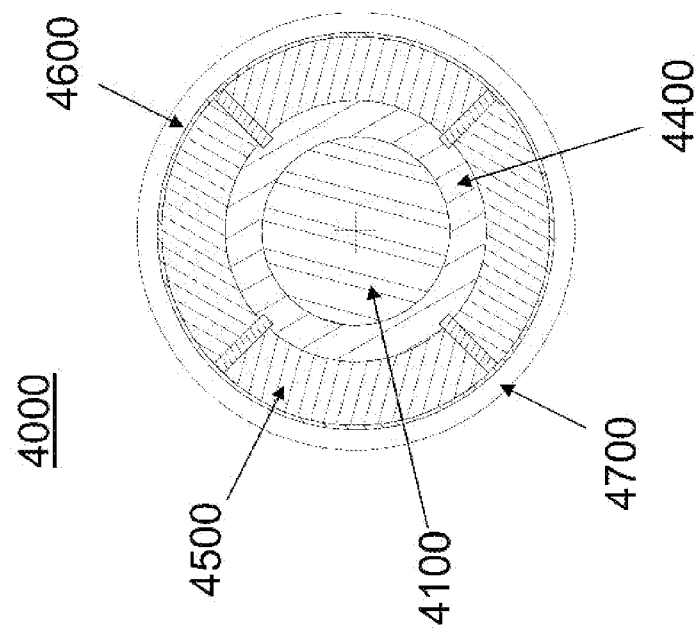
FIG. 6 is a cross-sectional view of an exemplary embodiment of a system 4000 taken at section B-B of FIG. 5.

FIG. 6 shows a cross-section of system 4000 taken along section B-B of FIG. 5. System 4000 can comprise rotor 4100, which can be substantially circumferentially surrounded by hub 4400, which can be substantially circumferentially surrounded by magnets 4500, which can be substantially circumferentially surrounded by sleeve 4600, which can be substantially circumferentially surrounded by band 4700.

Certain exemplary embodiments can provide a machine comprising: a rotor comprising a plurality of rare earth permanent magnets retained on said rotor via a cylindrical sleeve that is retained via a band comprising a stacked plurality of washer laminations, each of said washer laminations electrically insulated from an adjacent washer lamination; an opposing pair of end caps adapted to axially retain said stacked plurality of washer laminations on said rotor; and/or an opposing pair of end caps adapted to axially retain said stacked plurality of washer laminations on said rotor, at least one of said end caps comprising a threaded hole adapted to receive a correspondingly threaded fastener adapted to attach a balancing weight adapted to facilitate two-plane dynamic balancing of said rotor; wherein: said cylindrical sleeve is adapted to attenuate temporal variations of the magnetic field in the rotor generated by said plurality of rare earth magnets interacting with slots of a stator of said machine as said rotor rotates; said rare earth magnets comprise Samarium Cobalt; said rare earth magnets comprise Neodymium Iron Boron; each of said washer laminations has a yield strength of at least 170 ksi; each of said washer laminations comprises Inconel; each of said washer laminations has a maximum temperature capability of at least 1000 F; said plurality of magnets are radially polarized; said machine is a radial flux machine; said rotor is adapted to rotate at greater than 10,000 revolutions per minute; said rotor is adapted to rotate at greater than 100,000 revolutions per minute; said machine is a motor; and/or said machine is a generator.

DEFINITIONS

When the following terms are used substantively herein, the accompanying definitions apply. These terms and definitions are presented without prejudice, and, consistent with the application, the right to redefine these terms via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

- a—at least one.
- activity—an action, act, step, and/or process or portion thereof.
- adapted to—made suitable or fit for a specific use or situation.
- and/or—either in conjunction with or in alternative to.
- apparatus—an appliance or device for a particular purpose
- can—is capable of, in at least some embodiments.
- circuit—an electrically conductive pathway and/or a communications connection established across two or more switching devices comprised by a network and between corresponding end systems connected to, but not comprised by the network.
- comprising—including but not limited to.
- containing—including but not limited to.
- device—a machine, manufacture, and/or collection thereof.
- having—including but not limited to.
- including—including but not limited to.
- may—is allowed and/or permitted to, in at least some embodiments.
- method—one or more acts that are performed upon subject matter to be transformed to a different state or thing and/or are tied to a particular apparatus, said one or more acts not a fundamental principal and not pre-empting all uses of a fundamental principal.
- plurality—the state of being plural and/or more than one.
- predetermined—established in advance.
- probability—a quantitative representation of a likelihood of an occurrence.
- repeatedly—again and again; repetitively.
- set—a related plurality.
- substantially—to a great extent or degree.
- system—a collection of mechanisms, devices, machines, articles of manufacture, processes, data, and/or instructions, the collection designed to perform one or more specific functions.
- transform—to change in measurable: form, appearance, nature, and/or character.
- via—by way of and/or utilizing.
- weight—a value indicative of importance.

Note

Various substantially and specifically practical and useful exemplary embodiments of the claimed subject matter, are described herein, textually and/or graphically, including the best mode, if any, known to the inventors for carrying out the claimed subject matter. Variations (e.g., modifications and/or enhancements) of one or more embodiments described herein might become apparent to those of ordinary skill in the art upon reading this application. The inventors expect skilled artisans to employ such variations as appropriate, and the inventors intend for the claimed subject matter to be practiced other than as specifically described herein. Accordingly, as permitted by law, the claimed subject matter includes and covers all equivalents of the claimed subject matter and all improvements to the claimed subject matter. Moreover, every combination of the above described elements, activities, and all possible variations thereof are encompassed by the claimed subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any claimed subject matter unless otherwise stated. No language in the specification should be construed as indicating any non-claimed subject matter as essential to the practice of the claimed subject matter.

Thus, regardless of the content of any portion (e.g., title, field, background, summary, description, abstract, drawing figure, etc.) of this application, unless clearly specified to the contrary, such as via explicit definition, assertion, or argument, or clearly contradicted by context, with respect to any claim, whether of this application and/or any claim of any application claiming priority hereto, and whether originally presented or otherwise:

- there is no requirement for the inclusion of any particular described or illustrated characteristic, function, activity, or element, any particular sequence of activities, or any particular interrelationship of elements;
- no characteristic, function, activity, or element is "essential";
- any elements can be integrated, segregated, and/or duplicated;
- any activity can be repeated, any activity can be performed by multiple entities, and/or any activity can be performed in multiple jurisdictions; and
- any activity or element can be specifically excluded, the sequence of activities can vary, and/or the interrelationship of elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Moreover, when any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate subrange defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A machine, comprising:
   a rotor comprising a plurality of rare earth permanent magnets retained on said rotor via a cylindrical sleeve that is retained via a band comprising a stacked plurality of non-magnetic washer laminations, each of said non-magnetic washer laminations being electrically insulated from an adjacent non-magnetic washer lamination of the plurality of non-magnetic washer laminations; and
   an opposing pair of end caps configured to axially retain said stacked plurality of non-magnetic washer laminations on said rotor, at least one of said opposing pair of end caps defining a threaded hole configured to receive a correspondingly threaded fastener.

2. The machine of claim 1, wherein:
   said threaded fastener is configured to attach a balancing weight, and said balancing weight is configured to facilitate two-plane dynamic balancing of said rotor.

3. The machine of claim 1, wherein:
   said cylindrical sleeve is configured to attenuate temporal variations of a magnetic field in the rotor generated by said plurality of rare earth permanent magnets interacting with slots of a stator of said machine as said rotor rotates.

4. The machine of claim 1, wherein:
   said plurality of rare earth permanent magnets comprise Samarium Cobalt.

5. The machine of claim 1, wherein:
   said plurality of rare earth permanent magnets comprise Neodymium Iron Boron.

6. The machine of claim 1, wherein:
   each non-magnetic washer lamination of said plurality of non-magnetic washer laminations has a yield strength of at least 170 ksi.

7. The machine of claim 1, wherein:
   each non-magnetic washer lamination of said plurality of non-magnetic washer laminations comprises Inconel.

8. The machine of claim 1, wherein:
   each non-magnetic washer lamination of said plurality of non-magnetic washer laminations has a maximum temperature capability of at least 1000 F.

9. The machine of claim 1, wherein:
   said plurality of rare earth permanent magnets are radially polarized.

10. The machine of claim 1, wherein:
    said machine is a radial flux machine.

11. The machine of claim 1, wherein:
    said rotor is configured to rotate at greater than 10,000 revolutions per minute.

12. The machine of claim 1, wherein:
    said rotor is configured to rotate at greater than 100,000 revolutions per minute.

13. The machine of claim 1, wherein:
    said machine is a motor.

14. The machine of claim 1, wherein:
    said machine is a generator.

15. The machine of claim 1, wherein:
at least one end cap of said opposing pair of end caps includes a non-magnetic material.

* * * * *